US012228506B2

(12) United States Patent
Richarte et al.

(10) Patent No.: US 12,228,506 B2
(45) Date of Patent: Feb. 18, 2025

(54) TRANSDUCING AGENTS AND DEVICES FOR REMOTE SENSING

(71) Applicant: Urugus S.A., Montevideo (UY)

(72) Inventors: Gerardo Gabriel Richarte, Caba (AR); David Vilaseca, Caba (AR)

(73) Assignee: Urugus S.A., Montevideo (UY)

( * ) Notice: Subject to any disclaimer, the term of this patent is extended or adjusted under 35 U.S.C. 154(b) by 0 days.

(21) Appl. No.: 17/279,813

(22) PCT Filed: Sep. 23, 2019

(86) PCT No.: PCT/US2019/052480
§ 371 (c)(1),
(2) Date: Mar. 25, 2021

(87) PCT Pub. No.: WO2020/068694
PCT Pub. Date: Apr. 2, 2020

(65) Prior Publication Data
US 2021/0333203 A1    Oct. 28, 2021

Related U.S. Application Data

(60) Provisional application No. 62/736,347, filed on Sep. 25, 2018.

(51) Int. Cl.
*G01N 21/359* (2014.01)
*G01N 21/17* (2006.01)
*G01N 21/3563* (2014.01)

(52) U.S. Cl.
CPC ....... *G01N 21/359* (2013.01); *G01N 21/3563* (2013.01); *G01N 2021/1765* (2013.01); *G01N 2021/1797* (2013.01)

(58) Field of Classification Search
CPC ............ G01N 21/359; G01N 21/3563; G01N 2021/1765; G01N 2021/1797;
(Continued)

(56) References Cited

U.S. PATENT DOCUMENTS 10,674,654 B2 *   6/2020   George .................. A01G 22/00
2003/0218540 A1   11/2003  Cooper et al.
(Continued)

FOREIGN PATENT DOCUMENTS

CN    104035412 A  *  9/2014
EP     3620776 A1     3/2020
(Continued)

OTHER PUBLICATIONS

Liew et al., Signature Optical Cues: Emerging Technologies for Monitoring Plant Health, May 16, 2008, Sensors, vol. 8, pp. 3205-3239. (Year: 2008).*

(Continued)

*Primary Examiner* — Christine S. Kim
(74) *Attorney, Agent, or Firm* — Lee & Hayes, P.C.

(57) ABSTRACT

Methods, systems and devices for use in aerial or satellite-based applications to detect elements or magnitudes of interest, or monitor their changes, in a target location are disclosed. A transducing system includes a detector device to sense, transduce or detect optical properties of at least one transducing agent linked to the elements or magnitudes of interest. Based on the optical property of the transducing agent, the system generates information of the element or magnitude of interest. The methods and systems provide tools for detecting magnitudes from remote locations which are usually difficult or costly to measure on-site, thereby providing an efficient detection system for aerial detection systems.

19 Claims, 5 Drawing Sheets

(58) Field of Classification Search
CPC ........... G01N 21/23; G01N 2021/1793; G01N 2201/0214; G01N 21/31
See application file for complete search history.

(56) References Cited

U.S. PATENT DOCUMENTS

| | | | |
|---|---|---|---|
| 2016/0006950 A1 | 1/2016 | Sainct et al. | |
| 2016/0063420 A1* | 3/2016 | Tomii | G06Q 10/06314 |
| | | | 705/7.24 |
| 2017/0089761 A1 | 3/2017 | Engelke | |
| 2018/0100807 A1* | 4/2018 | Abdo | C09D 11/50 |
| 2020/0072757 A1* | 3/2020 | Taniguchi | G01N 21/59 |
| 2020/0200683 A1* | 6/2020 | Aronov | G06T 7/0012 |

FOREIGN PATENT DOCUMENTS

| | | |
|---|---|---|
| JP | 2004219129 | 8/2004 |
| WO | WO2012063241 A1 | 5/2012 |

OTHER PUBLICATIONS

Harper et al, "HAWC+. the Far-Infrered Camera and Polarimeter for SOFIA", Retrieved on Nov. 11, 2019 at << https:/fwww.worldscientific.com/doi/full/10.1142/S2251171718400081>>, Journal of Astronomical Instrumentation, vol. 7, No. 4, Sep. 6, 2018, 41 pages.

PCT Search Report and Written Opinion mailed on Dec. 12, 2019 for PCT Application No. PCT/US19/52480, 9 pages.

Alvino. et al., "Remote Sensing for Irrigation of Horticultural Crops", Horticulturae, vol. 3, No. 2, Jun. 16, 2017, p. 40.

Beth, et al., "UAV Based Hyperspectral Imaging of River Ecosystems", Jan. 1, 2016, Retrieved from the Internet: URL:https://www.researchgate.net/profile/Roberto_Beth/publication/318130142_UAV_Based_Hyperspectral_Imaging_of_River_Ecosystems/links/595b7bc2a6fdcc36b4dc282b/UAV-Based-Hyperspectral-Imaging-ofRiver-Ecosystems.pdf.

European Office Action mailed on Jan. 4, 2024 for European U.S. Appl. No. 17/279,813, a foreign counterpart of U.S. Appl. No. 17/279,813, 7 pages.

* cited by examiner

TRANSDUCING AGENTS AND DEVICES FOR REMOTE SENSING

CROSS REFERENCE TO RELATED APPLICATION

This application is a US national stage entry of International Patent Application No. PCT/US2019/052480, filed Sep. 23, 2019, which claims priority to U.S. Provisional Application No. 62/736,347, filed Sep. 25, 2018, entitled "TRANSDUCING AGENTS AND DEVICES FOR REMOTE SENSING," the entire contents of each of which are incorporated by reference herein.

BACKGROUND

Several applications could benefit from sensing from remote locations since remote sensing technology provides many advantages such as coverage of extensive areas, increased safety due to the reduced fieldwork, and a high number of sample points. Nevertheless, in certain situations the feasibility of sensing a magnitude from remote locations becomes impractical or even impossible.

Given that in some circumstances, in spite of the difficulties, it is desirable to obtain information from difficult-to-measure magnitudes, some usual approaches include obtaining this type of data by estimation or inference from related magnitudes which can be detected, and subsequently applying mathematical or physical models to obtain them. This usually leads to high levels of uncertainty. Other methods involve installing electronic sensors in the field or region of interest, however this is typically expensive and needs routine maintenance.

The problems noted above become exacerbated when there is a need to obtain information about a property, status, magnitude or characteristic of an object or living organism from remote locations with accuracy, sensitivity and selectivity. Consequently, there is a need for robust tools capable of detecting magnitudes which cannot be naturally or readily observed from remote locations, and can provide accuracy, sensitivity and selectivity.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
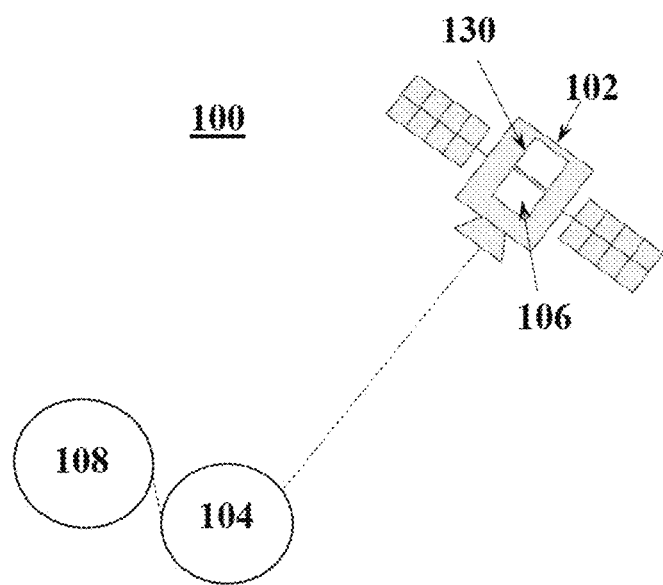
FIG. 1 illustrates an example of a satellite detector system for remote sensing.

Embodiments include methods, systems and devices for use in aerial or satellite-based applications, to detect elements or magnitudes of interest, or monitor their changes, in a target location, by sensing, transducing or detecting one or more optical properties of a transducing agent(s) linked to the elements or magnitudes of interest, and generating information of the element or magnitude of interest based, at least in part, on the optical property of the transducing agent.

Embodiments include a transducing system for detection of optical properties of transducing agents, wherein the transducing system is at a location remote from a variable of interest, such as from an aerial or satellite-based platform, comprising a detector device configure to operate at a preselected range of wavelengths and employing various computational algorithms in a processing unit (e.g., a processor or other logic circuit) to generate information related to the variable of interest based at least in part on the measurement of at least one optical property of the transducing agent.

In some instances, the detector device may include a sensor configured to detect optical properties, or their changes, at a preselected range of wavelengths of the electromagnetic radiation spectrum. For example, the detector device may be an imaging device having a plurality of pixel sensors, wherein a pixel in the image refers to the light that is captured by an imaging device that represents a corresponding location within the scene.

The transducing system may further include a control module, configured to measure, via the detector device, at least one optical property of the transducing agent to obtain a measurement, wherein the optical property is detectable over the preselected range of wavelengths of the electromagnetic radiation spectrum, wherein the optical property is linked to the variable of interest through a transducing agent. The control module may be further configured to generate information relating to the variable of interest based at least in part on the measurement of the at least one optical property of the transducing agent. As used herein, a transducing agent linked or related to a variable of interest means that one or more properties of the transducing agent is connected or correlated in some way to one or more properties of the variable, but it does not exclusively mean a physical or chemical connection between both.

The transducing agent has one or more defined or characteristic optical properties, among which at least one of the defined optical properties is related or linked to an element or magnitude of interest in a defined region or scene of interest. The transducing agent, may reveal or modify the optical property detectable over a preselected range of wavelengths if, for example, the magnitude of interest is present in a target location or if there is a change of the magnitude of interest in the target location. As used herein, a variable of interest refers to an element or magnitude of interest, and these terms can be used interchangeably.

The transducing system may further include one or more filters to selectively attenuate or pass desired frequencies to result in a spectral image having one or more spectrums of interest. As used herein, a filter refers to an optical filter that allows various wavelengths of light to pass through portions thereof. For example, an optical bandpass filter may contain one or more regions of the filter configured to selectively transmit a portion of the electromagnetic spectrum while attenuating or reflecting other wavelengths. Other examples of optical filters such as a notch filter, a multispectral optical filter, a continuously variable optical filter, a hyperspectral optical filter, may be used with embodiments described herein and are contemplated herein as providing the features and benefits described.

The detector device measures or detects electromagnetic radiation, including absolute or relative measurements of, for example, intensity, wavelength, frequency, and/or energy at one or more preselected ranges of wavelengths of the electromagnetic radiation spectrum, which may contain information on the change or modification of the optical property of the transducing agent. The measured or detected electromagnetic radiation includes, but is not limited to absorbed, reflected, refracted, radiated or transmitted electromagnetic radiation, and their combinations. In some embodiments, the detector device measures the electromagnetic radiation intensity from the transducing agent, and determines the wavelength, frequency, and/or energy of electromagnetic radiation.

In some instances, the preselected range of wavelengths may include one or more ranges of wavelengths which may be chosen to optimize the acquisition of a signal, for example by increasing the signal-to-noise ratio, taking into account the limitations and requirements imposed by the magnitude to be measured, the data to be obtained, the characteristics or properties of the transducing agent or any other parameter relevant for transducing, sensing or detection. In some embodiments, the detector device may be configured to operate in one or more preselected ranges of wavelengths of the electromagnetic radiation spectrum including, but not limited to, the visible-near-infrared (VIS-NIR) range, the infrared (IR) range, the Visible range, or any combination of them.

Also, some magnitudes or their changes may normally have their optical properties or spectral signatures distinguishable in a specific region of the electromagnetic spectrum, such as the short-wave infrared (SWIR) or long-wave infrared (LWIR) range, which cannot be easily detected by a remote sensing device. Measurements in the SWIR or LWIR range require special sensors which present several disadvantages such as more regulations and less sensitivity than those of traditional CMOS technology. Consequently, in some embodiments, when there is a change in the value of a variable of interest that is linked to the transducing agent, and this change is distinguishable in a range not easily detected by a remote sensing device, the transducing agent may modify at least one optical property, switching the detection range to a range detectable by a remote sensing device. For example, an atmospheric gas may be detectable on-site in the SWIR or LWIR range, but this range may not be accurately detected from a remote sensing device, so the transducing agent, may modify its spectral signature when the atmospheric gas is present in the target location along with the transducing agent, switching the detection range from the SWIR or LWIR range to the VISNIR range, the IR range, or the Visible range, so that it can be accurately detected by a remote sensing device or detector system capable of detecting signals over this range of wavelengths from a remote location, using, for example, traditional CMOS-technology sensors.

As used herein, optical properties of the transducing agent include, but are not limited to, measurements of the diffraction, refraction, refraction index, reflection, albedo or reflectance, absorption, transmittance, polarization, birefringence, color, photosensitivity, scattering, dispersion, dichroism, photoluminescence or spectral signature of the transducing agent. The optical property is detected by several means, including but not limited to, imaging devices, such as hyperspectral imaging devices, and devices that detect signals over one or more wavelengths of the electromagnetic spectrum. At least one of the defined optical properties of the transducing agent is related or linked to a magnitude of interest in a defined region or scene of interest, and can expose the magnitude of interest or show if there is any change to it.

In particular embodiments, the optical property related or linked to a magnitude of interest is the spectral signature of the transducing agent. The spectral signature of the transducing agent may be modified over a range of wavelengths of the electromagnetic radiation spectrum when the transducing agent is in contact or mixed with a variable of interest or senses or detects a change in at least one of the properties, status, characteristics, or any other relevant quantitative or qualitative data of the variable of interest, that is linked or related to the transducing agent, and whose change cannot, or is difficult to, be observed or detected from a remote location. As used herein, the spectral signature of a substance is the variation of reflectance or emittance of a material with respect to wavelengths, and gives information about the composition of the substance, and it is a function of the incidental electromagnetic wavelength and material interaction with that section of the electromagnetic spectrum.

Some magnitudes or variables of interest that may be linked or related to a transducing agent and may be difficult, complex or impossible to detect from remote locations include, but are not limited to, temperature, pressure, humidity, gas concentration, pH, atmospheric composition, wind direction, wind speed, microorganism, infections, and pests. The detection of greenhouse gases, such as water vapor ($H_2O$), carbon dioxide ($CO_2$), methane ($CH_4$), nitrous oxide ($N_2O$), ozone ($O_3$), Chlorofluorocarbons (CFCs), Hydrofluorocarbons (incl. HCFCs and HFCs), or hazardous gaseous emissions, sulfur dioxide ($SO_2$), and other gas species found at volcanoes, is an interesting and valuable source of information which is either difficult or even dangerous to detect from in-situ observations.

The processes, systems and devices described herein may be implemented in a number of ways. Examples of implementations are provided below.

The transducing system may be used for detecting optical properties at a target location from an aerial platform such as a drone, a plane, or a satellite, useful to detect difficult-to-measure variables from remote locations. The transducing system includes a detector device configured to acquire a signal obtained or derived from the transducing agent. The transducing agent is linked to an element or magnitude to be measured, both are located within the same target location, and the transducing agent can expose the presence or modification of the element or magnitude. For example, when there is a change of the magnitude, the transducing agent transduces that change into an electromagnetic radiation signal detectable by the detector device. The electromagnetic radiation signal received from the transducing agent is usually an electromagnetic radiation signal radiated, refracted, absorbed, transmitted or reflected by the transducing agent.

In some embodiments, the detector device may comprise an area imaging device having a plurality of pixel sensors, so when electromagnetic radiation is gathered from the target location while the aerial platform, such as a satellite, passes through the target location, the plurality of pixel sensors obtains information of the intensity and wavelength of the acquired electromagnetic radiation signal, enabling measurements at precise wavelengths in each pixel in the imaging system.

The transducing agent has defined optical properties, and when it detects the presence or modification of a magnitude or variable of interest is capable of revealing or modifying at least one of its optical properties. The transducing system also includes a control module configured to sense, transduce or detect the at least one optical property linked to the element or magnitude of interest over a preselected range of wavelengths. One example of a transducing agent is a birefringent material covering car roofs. To detect where the cars with the birefringent material are, in a defined area and at a given point in time, an imaging device on-board a drone or a satellite having polarizers captures images of the region of interest and a control module, after defining suitable spotlighting maneuvers, detects the light signal provided by the birefringent material indicating the presence of the cars having the birefringent material.

The control module is also configured to generate information of the magnitude or variable of interest, at the scene or region of interest, based at least in part on the changed of the at least one optical property of the transducing agent linked to the magnitude of interest and detected by the detector device. In some cases, the modification or change of the optical properties of the transducing agent is proportionally or gradually linked to the variation of the variable of interest. In others, the modification or change of the optical properties of the transducing agent is a switch of status, linked to the variation of the variable of interest. In further embodiments, the modification or change of the optical properties of the transducing agent is linked to the variation of the variable of interest in a stepped manner, such that the variation of the variable of interest is detected at given thresholds. The combination of the mentioned forms in which the change or modification of the optical properties of the transducing agent is linked to the variation of the variable of interest as well as other manners that may be used with embodiments described and contemplated herein are also included.

In some embodiments, the control module may be configured to capture one or more images associated with a geographic region including the variable of interest and the transducing agent. The control module may also be configured to analyze at least one of the one or more images to determine the measurement of the at least one optical property of the transducing agent, and generate information relating to the variable of interest, based at least in part on the measurement of the at least one the optical property of the transducing agent. The control module may be further configured to create an image or a video with the information obtained from the detector device. In some embodiments, a plurality of images may be captured successively as multiple partially overlapping images, with a determined amount of overlap, and a stitching algorithm may be utilized to generate a final image (or video frame) or a final video, from the multiple partially overlapping images.

Some examples of detector devices include devices for measuring and analyzing electromagnetic radiation energy, spectrometers, photodetectors, wavefront detector devices, polarization detectors, imaging systems such as multispectral or hyperspectral imaging devices or imaging spectrometers, and spectrally responsive receivers, such as a spectrometer or radiometer having filters at selected wavelengths (photoradiometer, spectroradiometer). In some embodiments, the detector device may include a telescope and the imaging device may be placed at the focal plane of the telescope. The detector device measures absorbed electromagnetic radiation energy, reflected electromagnetic radiation energy, transmitted electromagnetic radiation energy, and their combinations. Other examples of detector devices may be used with embodiments described herein and are contemplated herein as providing the features and benefits described.

The detector devices may be part of a moveable platform, such as a manned or unmanned aerial or satellite system, or may be on-board a manned aerial vehicle or an unmanned aerial vehicle such as a satellite, a drone, an aircraft, a spacecraft, or a plane. In some instances, the platform is not designed to move during detection, while in other implementations, the platform is in motion during detection. In some embodiments, the detector device is used exclusively for detecting the information provided by a transducing agent and/or the variable of interest, whereas in other embodiments, the detector device also performs other tasks on-board the aerial vehicle or is part of another device of the aerial vehicle. For example, a drone or a satellite has an imaging system which routinely captures information from across the electromagnetic spectrum to form an image, and when the drone or satellite passes over the region of interest, the imaging system captures information of the transducing agent to form an image of the scene of interest or to calculate or quantify a variable of interest.

In some embodiments, the filter may be disposed within an optical path of the imaging device to tailor the measurements of the spectrum of the light that is captured by an imaging device. For example, a specific spectrum from a transducing agent may be searched at a target location, so when the imaging device captures the light radiated or reflected from a particular area of the scene, the light will pass through different portions of a multispectral or hyperspectral optical filter and the spectrum for that particular area of the scene may be captured by the pixel sensors of the imaging device.

The transducing agent is an animate object or inanimate object which has one or more defined optical properties wherein at least one optical property is linked to a variable of interest. In some instances, the transducing agent is a ground-based transducing agent, indicating that the transducing agent is not part of the satellite or spacecraft. In some embodiments, the transducing agent is a material used to construct an object. In other embodiments, the transducing agent covers or dresses an object, for example as a cladding or coating, forms part or coexists with the object or living organism, or is applied onto its surface or an observable part of it after application of a surface treatment. In other instances, the transducing agent is attached, incorporated, included or covering an object which is located, installed or placed in an area of interest and has the capability of changing at least one of its optical properties, such as the spectral signature, when at least one measurable property of interest has changed.

Some embodiments of the detector systems and methods described herein may be employed to detect magnitudes from Earth or any other celestial object from satellites, such as satellites in Low Earth Orbit (LEO). The detector system can also be used in drones, planes or other type of aerial vehicles. FIG. 1 illustrates an example of satellite detector system 100 for detection from remote locations in which satellite 102 detects a change of an optical property of transducing agent 104 observable through detector device 106 (sometimes referred to as a "remote sensing device"). The detector device 106 may be located remotely from a variable of interest 108, as depicted in FIG. 1, by the detector device 106 being disposed on the satellite 102. Transducing agent 104 is present in a scene of interest and acts as a proxy, i.e. as a measured variable used to infer the value of a variable of interest 108. The variable of interest 108 is any physical or chemical phenomena, such as temperature or gas level/concentration, in a scene of interest, whose value can be inferred by the optical properties of the transducing agent 104 and is detectable by detector device 106 upon a change of at least one of the optical properties of the transducing agent 104. A control module 130 measures via the detector device 106 at least one of the optical properties of a transducing agent 104 to obtain a measurement, and generates information relating to the variable of interest 108 based at least in part on the measurement of the optical property of the transducing agent 104. This information generated on-board the satellite 102 may be stored and then transmitted to a remote location, such as a ground station. In some instances, the control module 130 may be on the ground, so it sends information to the detector device 106 to gather electromagnetic radiation from the scene of interest and measures via the detector device 106 at least one of the optical properties of a transducing agent 104. The satellite 102 may store the measurement of the optical properties of the transducing agent 104 and then may transmit it to ground, so the control module 130 generates information relating to the variable of interest 108 on the ground. The control module may use reference tables, reference measurements, previous captures or previous measurements as reference to generate information relating to the variable of interest 108 based on the optical properties of the transducing agent 104.

Depending on the application, the transducing agent is present in the scene of interest along with the object or living organisms subjected to a variation of the variable of interest, as a car paint, rooftop tiles, road pavement, or any other form, without interfering with the variable of interest. In the event that the transducing agent interacts with the object or living organisms subjected to a variation of the variable of interest, this interaction can be reversible or irreversible. In the event that the transducing agent reacts to the object or living organisms subjected to a variation of the variable of interest, this reaction can be reversible or irreversible. In particular embodiments, the transducing agent is reversibly linked to the element or magnitude of interest, and the transducing agent remains in the scene of interest reversibly modifying or changing its optical properties with the variation of the variable of interest.

The transducing agent is an animate or inanimate object comprising a biological substance, a non-biological substance, an organic substance, an inorganic substance, a natural substance, or a synthetic substance, depending on the application, the method of use, and the variable or magnitude of interest. In some embodiments, the transducing agent is a thermo-sensitive or photosensitive composition. In other embodiments, the transducing agent is a biomaterial, biomarker or biosensor which can trigger a reaction for early disease detection, or to detect a possible threat, or the lack or abundance of a specific material or nutrient on plants, animals or the environment. Biosensors in these embodiments rely on biochemical materials commonly found in living cells and tissues to identify specific chemical signals and trigger a reaction to alert about a condition of interest. This reaction is designed to be detectable by an electromagnetic radiation system capable of measuring and analyzing electromagnetic radiation information. In some embodiments, the transducing agent is a living organism having a certain optical property, capable of modifying it when a magnitude of interest changes. One example is a plant or a genetically modified plant sensitive to a bacteria capable of changing its color when infected, so that it becomes detectable by a camera on-board a satellite capturing images in the visible range.

One application relates to pathogen detection. Infectious diseases seriously impact animal welfare and plant life, and have potential environmental and global adverse consequences. For this reason, early pathogen detection in farms and field conditions is an important step for the diagnostics and successful treatment of animals and plants, with the objective of reducing the negative impact of infectious diseases in plantations, livestock and poultry, which limit productivity and increase significantly economic losses to these sectors. It is also known that diagnostics of infection disease require high sensitivity since pathogens might spread rapidly before any clinical sign appears in animals. There are different techniques employed to diagnose pathogens in livestock, poultry, and plants, however these methods have proved to be unsuitable for in-field analysis or incapable of being detected by remote sensing tools. Embodiments disclosed herein include transducing agents acting as early biological alerts to detect phenomena that affects animals, plants or pieces of land.

According to some embodiments, a satellite includes a detector device comprising an imaging system, one or more processors and a memory, along with programming instructions stored on the memory and executable by the one or more processors. The instructions cause the processor(s) to perform acts, including directing the imaging device to take at least one exposure of a scene of interest at a target location to detect or monitor a variable of interest.

The instructions may further cause the processor(s) to analyze the exposure to obtain data from at least one optical property of a transducing agent present at the target location and having one or more defined optical properties, wherein the optical property is linked to the variable of interest so that the presence or change of the variable of interest is correlated to a measure of an optical property of the transducing agent.

The image may be analyzed to detect an optical property, such as the spectral signature of the transducing agent, or a change of the optical property. In either case, the optical property of the transducing agent is linked to the variable of interest, usually reversely. Consequently, a change of an optical property would reflect a change of the variable of interest. The instructions may further cause the processor(s) to generate data of the variable of interest based on the detected optical property of the transducing agent. The instructions may further cause the processor(s) to use a formula or other means to convert the observed optical property into a measurement of the variable of interest.

In some embodiments, the detector device is an imaging system such as a multispectral imaging device, a hyperspectral imaging device, a panchromatic or narrow bandwidth imaging device, wavefront detector device, polarization detectors, or an imaging spectrometer, having an imaging sensor, a multispectral or hyperspectral optical filter, lenses, filters, focus correctors, pixel sensors, as well as other commonly used components. By having a multispectral or hyperspectral optical filter which allows various wavelengths of light to pass through portions thereof, it is possible to detect changes of the spectral signature in different regions of the electromagnetic radiation spectrum, such as the infrared or visible regions. Also, the imaging system further includes a processor to perform image capture functions and image processing functions such as image compression, image formatting, tone mapping to generate high dynamic range (HDR) images, a resolution enhancement algorithm to produce high-resolution images, orthorectification, and a stitching algorithm to generate images from multiple partially overlapping exposures, as well as other processing functions, such as blur removal, artifact removal, color enhancement, cropping, image conversion, image compression, data encryption, and so forth.

According to some embodiments, a method to generate information of a variable of interest from an agent detected from remote locations includes directing a detector device to capture at least one exposure of a scene of interest having a transducing agent with defined optical properties, detecting at least one optical property of the transducing agent linked to an element or variable of interest, and generating data relating to the variable of interest based at least in part on the information about the detected optical property of the transducing agent. The method may also include placing a transducing agent in an area/scene of interest. For example, the transducing agent may be attached, incorporated, included or covering an object which is located, installed or placed in an area of interest, may form part or coexist with the object or living organism, or may be applied onto a surface. In the instances where the optical properties, such as the spectral signature, of a variable of interest or its change is distinguishable in a specific region of the electromagnetic spectrum hardly detected by a remote sensing device, the method may also include using a transducing agent linked to the variable of interest that modifies at least one optical property which is detectable by the detector device remotely located, giving the net effect of switching the detection range to a range detectable by a remote sensing device or detector system. The method to generate information from a transducing agent detected from remote locations can be performed on the ground or on-board an aerial vehicle, such as a satellite, drone, plane, spacecraft or similar.

Embodiments also include detecting a reference signal and a measurement signal and generating data relating to the variable of interest based at least in part on information provided by both signals. The measurement signal is the signal obtained after detecting at least one optical property of the transducing agent. The reference signal is obtained by detecting the optical properties of a reference material having predetermined optical properties which may be placed close to (e.g., within a threshold distance of) the transducing agent or a material having the transducing agent. The predetermined optical properties are optical properties, or their modification/changes, that are detectable by the detector device, which provide known data to give a value of reference, which can be used, for example by the control module, in the calculation of the value of the variable of interest because it gives the detector comparable signal levels useful for calculations. In some instances, the value of reference is a known data previously determined by other means and may be used in the calculation of the value of the variable of interest by the control module.

In the embodiments where the detector device includes an imaging system, the method may also include capturing one or more exposures of a target location with a specific spectral or wave band using an imaging device. The specific spectral band may comprise one or more spectral bands, with narrow or broad bandwidths. The method may also include analyzing the exposures to obtain information about the spectral signature of the transducing agent, which is linked or related to a variable of interest in a reversible or irreversible manner at the target location. The method may also include post-processing and correcting the acquired exposures, and extracting the information about the spectral signature from the one or more exposures at pixel level to identify and/or classify the spectral signature of the transducing agent. The method may also include generating data of the variable of interest, based at least in part on the spectral signature of the transducing agent. In some instances, the method may include generating an image or video based on one or more exposures to obtain information about the spectral signature of the transducing agent linked to the variable of interest. When more than one exposure is captured successively, in general, the exposure of each successive image has a determined amount of overlap, which enables the exposures to be combined or stitched together to form an image of arbitrary length, sufficient to cover the area/scene of interest. The method may also include generating data based on reference tables, reference measurements, previous captures or previous measurements taken as reference which relate the optical properties, such as the spectral signature, of the transducing agent with the variable of interest.

In some embodiments, the transducing agent comprises an active or passive device configured to measure the variable of interest within an environment and emit electromagnetic radiation indicative of the variable of interest towards the detector device on-board the aerial or satellite system. For example, the transducing agent may be a device powered by solar panels or biological batteries configured to measure a variable of interest in a region or scene of interest, or obtain statistical or cumulative information from a variable of interest or its environment, and send this information to the aerial or satellite-based detector device as an electromagnetic signal. Another example of transducing agent may be a gas detector located in a residential house, which detects gas concentrations at several time intervals, and sends this information to the detector device as an electromagnetic signal containing this information. The aerial or satellite-based detector device receives the electromagnetic signal within a preselected range of wavelengths, and the control module generates data of the variable of interest, based at least in part on the received electromagnetic signal. In these embodiments, the transducing system is configured to act as a super low bandwidth uplink channel to be installed on remote locations, for example, to monitor integrity or maintenance needs of remote oil and gas equipment. In this manner, relevant information can be accessible through a satellite.

Embodiments include methods of detecting an optical property of a transducing agent including gathering electromagnetic radiation from a target location; determining the spectrum of the gathered electromagnetic radiation; determining, based on one or more sections of the spectrum, the optical properties of the transducing agent; and generating information relating to the variable of interest based at least in part on the optical properties of the transducing agent. The method may further include gathering electromagnetic radiation from a specific target location multiple times, to detect at least one change on the spectrum of the transducing agent, wherein the change is in accordance with at least one of a gradual change, a stepped change, or a switch change.

Radiation may be gathered, for example, using a detector device comprising an imaging sensor having a plurality of pixel sensors. As the detector device passes over the target location, light radiated or reflected from the target location will be captured by the addressable elements within the detector device, and the spectrum at each addressable element will be determined. The spectrum of the gathered electromagnetic radiation contains one or more sections wherein the optical properties of the transducing agent are revealed or modified, in accordance with the variable of interest. A control module may be configured to analyze the information from all the pixel sensors to identify one or more sections of the spectrum that contain information on the optical properties of the transducing agent. The control module may further infer or determine the optical properties of the transducing agent based on the one or more sections of the spectrum from the gathered electromagnetic radiation, and may be configured to generate information relating to the variable of interest based at least in part on the optical properties of the transducing agent.

In some embodiments, the transducing agent may measure the variable of interest within a target location and may either radiate or reflect electromagnetic radiation containing information about its optical properties which are related to the variable of interest at the target location. The electromagnetic radiation radiated or reflected by the transducing agent is gathered by a detector device comprising, for example, a sensor on-board an aerial vehicle, configured to receive electromagnetic radiation. A control module may be configured to determine the spectrum of the received electromagnetic radiation by decoding the electromagnetic radiation received by the sensor, and may infer based on one or more sections of the spectrum, the optical properties of the transducing agent. After identifying the optical properties of the transducing agent contained in the electromagnetic radiation signal, the control module may generate information relating to the variable of interest, based at least in part on the optical properties of the transducing agent contained in one or more sections of the spectrum of the gathered electromagnetic radiation.

Various examples are described herein to aid in illustration, although those examples are not meant to be taken in a limiting sense.

Example of Transducing Systems

Figure 2:
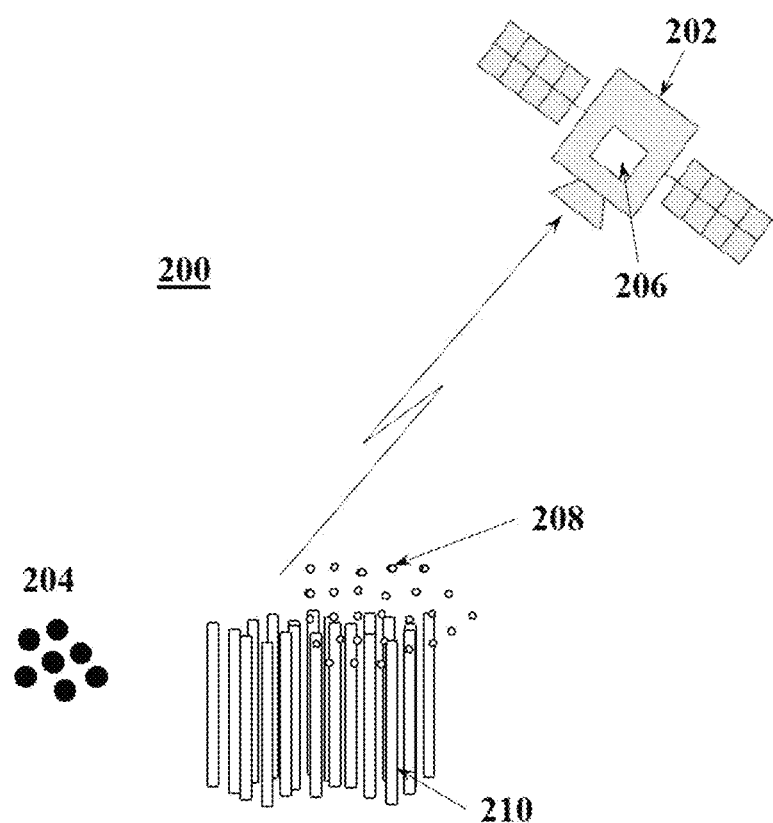
FIG. 2 illustrates an example of a transducing system configured to detect humidity changes from a satellite.

A crucial factor in agricultural production is the influence that environmental conditions have on the growth of crops. Given the extension of the fields, it would be desirable to monitor the environmental conditions in an extended region and to early detect any adverse or undesired state or event that would affect the optimal growth of the crops. One example refers to genetically modified living organisms engineered in a laboratory and having at least one optical property designed/configured to provide predictable changes linked to changes in a variable of interest of animals, plants or pieces of land. These genetically modified living organisms have the property of preserving or conserving the crops of interest. FIG. 2 provides an example of transducing system 200 comprising genetically modified seeds 204 which are seeded in the scene or region of interest, and are allowed to grow along with the crops of interest 210, such as soybean crops. Genetically modified seeds 204 are designed to change their color when the content of humidity 208 of the environment also changes. The change of color is detectable by a camera 206, such as a panchromatic or hyperspectral camera, located in a satellite 202. In some cases, the change is detected gradually because the color changes proportionally with the content of humidity, and the detecting device provides a value directly related to the humidity content. For example, a hyperspectral camera may be used to capture one or more images from the satellite 202, to have a higher spectral resolution, and the control module may analyze the colors of the images to generate data about the content of humidity. The control module may use a reference table having information which relates the colors of genetically modified seeds 204 with the content of humidity, or may have generated the table relating the color of the genetically modified seeds 204 with the content of humidity from previous captures. In other cases, it is useful to alert when the humidity content exceeds a predetermined value, so genetically modified seeds 204 change their color almost instantaneously when a threshold of humidity content is reached. This different color of genetically modified seeds 204 is detected by a camera located in a satellite, such as a panchromatic camera which captures images in the visible range at a certain frequency during a period of time, such as a day or week. The control module may analyze the images and, based for example on the colors of the image(s), may determine whether the humidity content has reached a predetermined threshold. Other example includes the case in which the genetically modified seeds 204 change their color when the soil has reached a predetermined content of water, endangering the health of the crops. Genetically modified seeds 204 are designed to change their color when the content of water of the soil has reached a critical value and are too dry, or on the contrary, when the level of water is alarmingly high. In some instances, the image capture may be performed on-board the satellite, and some (or all) of the image processing may be performed off-board the satellite. The image processing capabilities may be shared between multiple satellites within a constellation, or between a satellite and a ground-based station. And either the images or the analysis from the images e.g. the content of humidity, may be stored and then transmitted to a satellite and/or a ground-based station.

Figure 3:
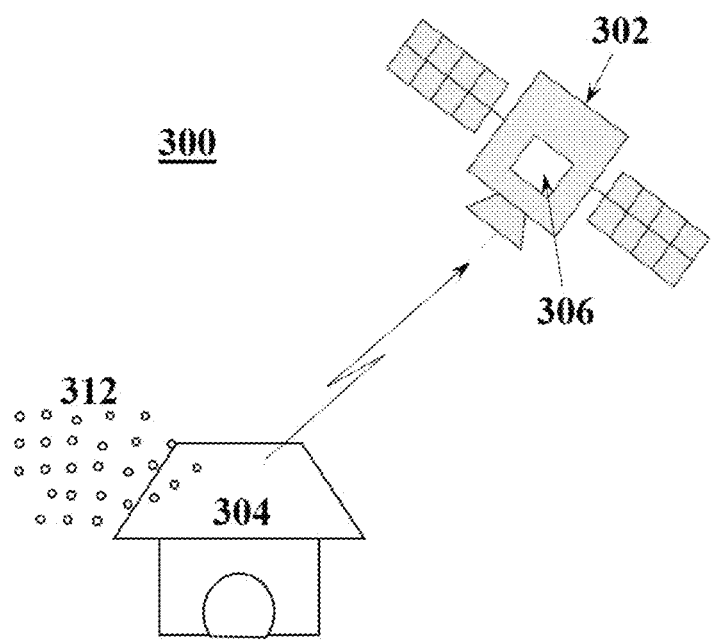
FIG. 3 illustrates an example of a transducing system comprising a satellite and rooftop tiles to detect the presence or content of a gas.

In certain situations, it is useful to measure the presence or concentration of a gas in a certain area of interest, from remote locations. FIG. 3 illustrates a satellite transducing system 300 comprising rooftop tiles 304 made of material configured to change their color in relation to the presence or concentration of the gas 312 contacting the rooftop tiles 304 in order to be detected by an imaging device 306. Rooftop tiles 304 are located on constructions such as houses or buildings, covering their surfaces, and when the gas 312 contacts the roofs, the rooftop tiles 304 change their reflectance with respect to sunlight, exhibiting a different color, related to the presence or concentration of gas 312. In turn, this change of reflectance or emittance is correlated with a change in the level of luminance, which is detected by a sensing device 306 located remotely from the object, such as satellite 302. Given that satellite 302 passes over the area of interest at certain intervals, satellite 302 can detect the color or level of luminance of rooftop tiles 304 when passing over the area of interest and generate information about the accumulated concentration of gas by the roof between passes. The information may be stored and/or transmitted to a ground station.

In some instances, the interest is to measure unknown variables such as the temperature of the environment surrounding the roofs, or the temperature inside the building having the roof tiles, without taking into account the increase of temperature due to the heating of the roof tiles by the sun. In some cases, the change of reflectance or emittance, and hence the level of luminance, of the variable of interest is not linear, consequently, it is possible to sum up both the level of luminescence of the variable of interest and the level of luminescence due to the heating of the sun to extract from the sum any linear component, since it is assumed that the temperature due to the heating of the sun, and hence the level of luminescence, changes gradually over time and may be modelled as a linear component. The resulting level of luminescence is then correlated to the temperature of the variable of interest and the temperature of the unknown variable may be calculated.

In some embodiments, another material, such as a reference material, having predetermined optical properties is also placed close to the transducing agent to provide predetermined variations of its optical properties in order to give a value of reference, which can be used in the calculation of the value of the variable of interest. This gives the detector comparable signal levels useful for its calculations. An example illustrating this embodiment may be a diffuse reflector or a Lambertian surface, such as a diffuse mirror, placed close to the transducing agent or the material having the transducing agent, which gives a known measurement of reflectance at predetermined wavelengths of the electromagnetic radiation spectrum. A measuring apparatus such as a photodetector, placed in a remote location, receives and measures the intensity of both the reference and the measurement signals and a control module calculates the value of the variable of interest based at least in part on the measurements of the optical property of the transducing agent and the reference material.

Figure 4:
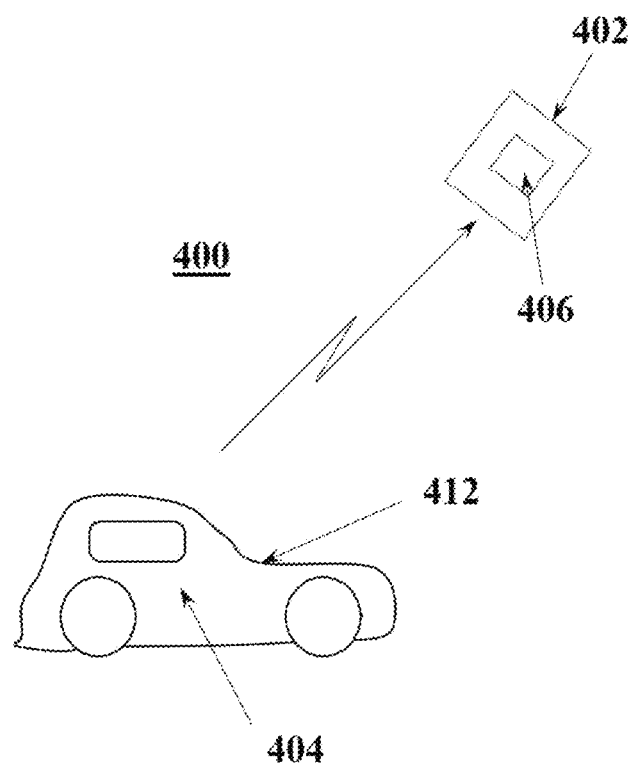
FIG. 4 illustrates an example of a remote detector system used to sense $CO_2$ emissions generated by vehicles such as cars, planes, trains and buses, from remote locations.

FIG. 4 illustrates one example of remote detector system 400 used to accurately sense $CO_2$ emissions generated by vehicles such as cars, planes, trains and buses, from remote locations. To easily identify and quantify the $CO_2$ emissions, transducing agent 404 is applied as a paint covering the surface of the vehicle 412. When a threshold is reached, transducing agent 404 changes its spectral signature which can be detected by imaging device 406 on aerial platform 402 such as a hyperspectral camera on a satellite. The imaging device 406 captures and processes the digital images to identify its spectral signature and recognize that a certain threshold has been reached. Likewise, the remote detector system is useful to detect fermentation products like $CO_2$, ethanol, lactic acid or hydrogen gas in hermetic systems such as hermetic plastic bags containing grains, by applying the paint comprising the sensing agent in visible areas of these hermetic systems.

Figure 5:
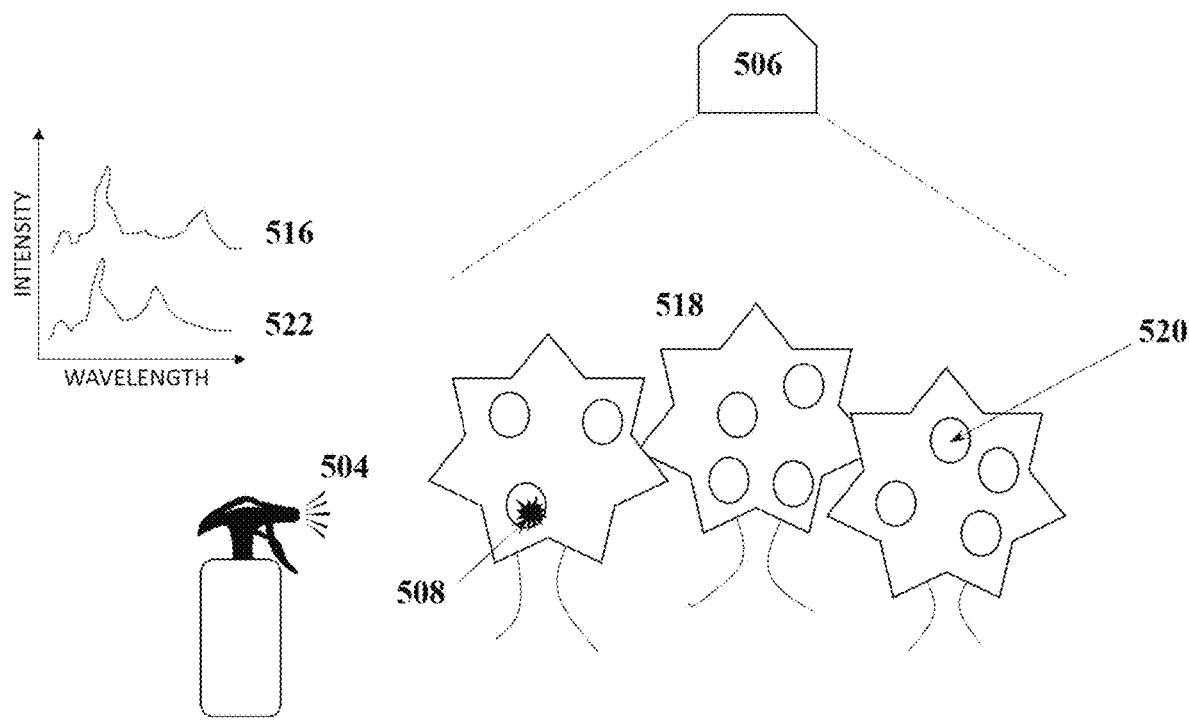
FIG. 5 illustrates an example of an electromagnetic detection system placed in an aerial platform used to detect pathogens causing plant diseases.
Figure 6:
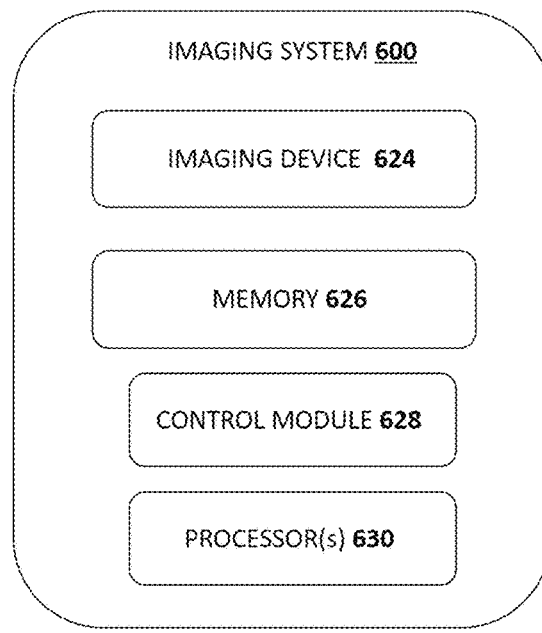
FIG. 6 is a block diagram showing an example of an imaging system comprising pixel sensors.

Certain pathogens cause plant diseases which affect citrus and endanger their production. One solution to detect them in extent plantations is illustrated in FIG. 5 in which a transducing agent is designed to change its spectral signature if the presence of any pathogen such as fungus, bacteria, or vector-transmitted pathogens, is detected in fruits. Transducing agent 504 having a defined spectral signature 516 is sprayed over a plantation of lemon trees 518 and is ready to detect any undesired pathogen 508 affecting lemon trees 518, without adversely affecting the fruits 520. Upon contact with the pathogen 508, such as *Candidatus liberibacter* spp., lemon trees 518 start exhibiting a yellowing color which can be detected by naked eye only in fruits. However, given the large extension of plantations, the method to detect the natural response of plants to the pathogen by human inspection in field is highly inaccurate and ineffective. In addition, by the time the infection manifest itself, it could be too late to treat the plants. In order to increase the sensitivity and accuracy, transducing agent 504 changes its spectral signature 522 as soon as it detects pathogen 508 in the plant and fruits 520. This change is detected by electromagnetic detection system 506 placed in an aerial platform, such as a drone, and its control module may determine the degree or level of infection of the lemon trees at the target location, or whether the lemon trees are infected by the pathogen. In other examples, apart from detecting pathogens, the transducing agent which covers the plants and fruits can be designed to detect lack of nutrients in the plants, by changing to a specific color and/or producing a defined color pattern on the fruits and leaves.

Another non-limiting example includes the generation of information related to the degree of humidity of grains inside a Silo bag, by detecting the spectral signature of the Silo bag containing the grains. The Silo bag is first manufactured comprising a transducing agent so that the resulting Silo bag has a spectral signature correlated with the degree of humidity of the grains. In order to generate information on the humidity content of grains inside the bag, a remote sensing platform, such as a satellite or a drone, equipped with an area imaging device having a plurality of pixel sensors that allow the capture of raw image data, passes over the land where the bag is located, and captures one or more raw image data or remote imaging data. In some cases, the area imaging device further includes a multispectral or hyperspectral filter and captures sequential images, each image having imaging data at a plurality of wavelengths, such that the whole Silo bag is captured at one or more desired spectral bands selected from the electromagnetic spectrum. Desired spectral bands can include as many bands as necessary to obtain the spectral signature of the Silo bag, correlated with the degree of humidity. A processing unit captures and processes the multispectral/hyperspectral image to correct defects and determine the spectral signature of the raw image data. The processing unit further uses the information of the spectral signature of the Silo bag to determine the degree of humidity. The processing unit may use a reference table to correlate the spectral signature of the Silo bag with the degree of humidity. The raw data is processed to produce the desired information of humidity content on the area of interest at a certain moment. But it can also be used to produce information of the change of humidity over time. The remote sensing platform passes over the area of interest at certain intervals, captures one or more remote imaging data and produces information to determine changes or lack of change associated with the degree of humidity. The produced information is typically produced and stored in a digital format that can be transmitted as commonly done with digital information.

Example of Imaging System

In some instances, the detector device is all or partially on-board an aircraft or spacecraft and includes a suitable imaging system to detect the optical properties and the change of the optical properties of the variable of interest linked to the transducing agent. An imaging system 600 is illustrated as a block diagram in FIG. 6. The imaging system 600 may be all or partially on-board an aircraft or spacecraft, such as the satellite 102, which may be a Low-Earth Orbit satellite or a geostationary satellite. In some embodiments, some of the components of the imaging system 600 may be ground-based or on-board a separate aircraft or spacecraft, with such ground-based or separate aircraft or spacecraft in communication with a portion of the imaging system 600 that includes the optics systems (e.g., a telescope, a lens and a sensor array, among other things). The imaging system 600 may be configured with any suitable computing device or system, and typically includes imaging device 624, memory 626, a control module 628 and one or more processor(s) 630. Imaging device 624 comprises sensors and sensor arrays, including pixel sensors. The pixel sensors include, in at least some embodiments, semiconductor charged coupled devices (CCD), complementary metal-oxide semiconductor (CMOS) active pixel sensors, N-type metal-oxide semiconductor (NMOS) technologies, and so forth. Suitable imaging systems also comprise optical filters such as bandpass filters. Other examples are possible without departing from the scope of embodiments. Memory 626 may store program instructions and program modules that are loadable and executable on one or more processor(s) 630, as well as data generated during execution of, and/or usable in conjunction with, these programs, such as image data, images, and so forth. In various embodiments, the computer-readable memory 626 comprises non-transitory computer-readable memory 626 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 626 may also be described as computer storage media and may include volatile and nonvolatile, removable and non-removable media implemented in any method or technology for storage of information, such as computer readable instructions, data structures, program modules, or other data. Computer-readable memory 626 may be an example of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by components of the imaging system 600. Any such computer-readable storage media may be part of the imaging system 600. Processor(s) 630 perform or otherwise control various functions of the imaging system 600. These functions may include to perform image capture functions and image processing functions. The imaging device 624 can include a sensor array, lenses, filters, focus correctors, polarizers, as well as other commonly used components. The imaging system 600 is configured to provide image data, at various stages of processing, to another device, such as a ground-based device via a transmission media, or a satellite. It should be appreciated that additional elements may be present, which are routine in the art.

Conclusion

Although the disclosure uses language that is specific to structural features and/or methodological acts, the invention is not limited to the specific features or acts described. Rather, the specific features and acts are disclosed as illustrative forms of implementing the invention.

What is claimed is:

1. A transducing system for detection of optical properties of transducing agents from locations remote from a variable of interest, the system comprising:
   a detector device comprising an imaging system having a plurality of pixel sensors on-board a manned or an unmanned space vehicle, the detector device configured to operate at a preselected range of wavelengths; and
   a control module configured to:
      capture one or more images associated with a geographic region including the variable of interest, a transducing agent, and an object;
      analyze at least one image of the one or more images to determine a measurement of at least one optical property of the transducing agent, the at least one optical property being detectable over the preselected range of wavelengths, wherein the transducing agent is attached, incorporated, included, applied or covering the object which is located, installed, or placed in an area of interest, the object being subjected to a variation of the variable of interest, the transducing agent being placed so as to expose a presence or change of the variable of interest through the at least one optical property; and
      generate information relating to the variable of interest based at least in part on the measurement of the at least one optical property of the transducing agent.

2. The system according to claim 1, wherein the transducing agent comprises at least one of a biological substance, a non-biological substance, an organic substance, an inorganic substance, a natural substance, a synthetic substance, or a living organism.

3. The system according to claim 1, wherein the transducing agent is reversibly linked to the variable of interest.

4. The system according to claim 1, wherein the at least one optical property is a spectral signature of the transducing agent.

5. The system according to claim 1, wherein the transducing agent further comprises an active device or a passive device configured to measure the variable of interest within an environment and emit electromagnetic radiation indicative of the variable of interest towards the detector device.

6. The system according to claim 1, wherein the preselected range of wavelengths is at least one of the visible-near-infrared (VISNIR) range, the infrared (IR) range, or the Visible range.

7. The system according to claim 1, further comprising an optical filter containing one or more regions, the one or more regions configured to selectively transmit a portion of the electromagnetic spectrum.

8. The system according to claim 1, wherein the detector device further comprises at least one of a spectrometer, a radiometer, a photoradiometer, a photo-detector, a wavefront detector device, a polarization detector, a spectrally responsive receiver, a spectrometer having filters at selected wavelengths, or a radiometer having filters at selected wavelengths.

9. The system according to claim 1, wherein the imaging system comprises at least one of an area imaging device, a panchromatic imaging device, a narrow bandwidth imaging device, a multispectral imaging device, a hyperspectral imaging device, or an imaging spectrometer.

10. The system according to claim 1, further comprising an imaging module configured to form an image or a video of a scene based at least in part on the one or more images.

11. The system according to claim 1, wherein the one or more images comprise multiple images captured successively as multiple partially overlapping images with a determined amount of overlap, and wherein the control module is further configured to apply a stitching algorithm to generate a final image or a final video from the multiple partially overlapping images.

12. The system according to claim 1, further comprising a material having predetermined optical properties to provide a reference value, and the control module is further configured to generate the information relating to the variable of interest, based at least in part on an optical property of the material.

13. The system according to claim 1, wherein the transducing agent comprises a genetically modified living organism capable of modifying the at least one optical property so as to expose the presence or change of the variable of interest through the at least one optical property.

14. A method to detect or monitor a variable of interest from locations remote from the variable of interest, the method comprising:
- capturing, from an imaging device on-board a manned or an unmanned space vehicle, one or more images of a target location within a specific spectral range;
- analyzing the one or more images to obtain information about a spectral signature of a transducing agent, wherein the transducing agent is attached, incorporated, included, applied or covering an object which is located, installed, or placed in an area of interest, the object being subjected to a variation of the variable of interest; and
- generating data relating to the variable of interest, based at least in part on the information about the spectral signature of the transducing agent, wherein the transducing agent is placed so as to expose a presence or change of the variable of interest through the spectral signature.

15. The method according to claim 14, further comprising:
- post-processing and correcting the one or more images; and
- extracting the information about the spectral signature from the one or more images at pixel level to identify and/or classify the spectral signature of the transducing agent.

16. The method according to claim 14, further comprising:
- detecting at least one optical property of the transducing agent;
- detecting a reference signal and a measurement signal; and
- generating the data relating to the variable of interest based at least in part on information provided by the reference signal and the measurement signal;
- wherein the measurement signal is obtained after detecting the at least one optical property of the transducing agent.

17. The method according to claim 14, wherein the one or more images comprise multiple images captured successively with a determined amount of overlap, the method further comprising generating an image or a video based at least in part on the multiple images captured successively with the determined amount of overlap.

18. A method of detecting an optical property of a transducing agent, the method comprising:
- capturing one or more images of a target location from a location on-board a manned or an unmanned space vehicle;
- determining the spectrum of at least one of the one or more images;
- determining, based on one or more sections of the spectrum, optical properties of the transducing agent; and
- generating information relating to a variable of interest based at least in part on the optical properties of the transducing agent, wherein the transducing agent is attached, incorporated, included, applied or covering an object which is located, installed, or placed in an area of interest, the object being subjected to a variation of the variable of interest, the transducing agent being placed so as to expose a presence or change of the variable of interest through the optical properties.

19. The method according to claim 18, further comprising capturing one or more images of a specific target location multiple times, to detect at least one change on the spectrum of the transducing agent, wherein the at least one change is in accordance with at least one of a gradual change, a stepped change, or a switch change.

* * * * *